United States Patent [19]
Miller et al.

[11] 3,949,733
[45] Apr. 13, 1976

[54] STEAM HEATING APPARATUS

[75] Inventors: Dye O. Miller, Mount Prospect; August J. Antunes; Jerome Antunes, both of Elmhurst, all of Ill.

[73] Assignee: A. J. Antunes & Co., Chicago, Ill.

[22] Filed: Feb. 14, 1975

[21] Appl. No.: 550,033

[52] U.S. Cl. .................. 126/348; 126/369; 99/467; 219/273; 219/319
[51] Int. Cl.² ............................................. F24H 1/18
[58] Field of Search ...... 126/348, 369, 20; 219/271, 219/273, 316, 319, 362, 381, 401; 99/467, 473, 475, 476; 137/592

[56] References Cited
UNITED STATES PATENTS

| | | | |
|---|---|---|---|
| 2,674,935 | 4/1954 | Lewis et al. | 99/473 |
| 2,719,211 | 9/1955 | Lewis et al. | 99/467 |
| 2,980,099 | 4/1961 | Klemm | 99/473 |
| 3,203,414 | 8/1965 | Lassiter | 126/348 |
| 3,291,030 | 12/1966 | Arnold | 219/271 |
| 3,814,901 | 6/1974 | Morhack | 219/362 |

Primary Examiner—Kenneth W. Sprague
Assistant Examiner—Larry I. Schwartz
Attorney, Agent, or Firm—Coffee and Sweeney

[57] ABSTRACT

A steam heating apparatus for heating food items such as pastries, rolls, sandwiches or the like to render them appetizing in appearance and taste. The device includes a steam generating chamber below a food support plate upon which food items are placed for steam heating. A generally horizontal, elongated tube enters the steam chamber through an over-sized aperture in one of the side walls for spraying water through side orifices in the tube into the steam chamber onto a subjacent heated platen. The elongated tube is thermally insulated from the side wall to prevent heating of the incoming water which would tend to cause mineral clogging of the orifices as the water is sprayed therethrough. The food support plate comprises a generally corrugated metallic difuser tray having a plurality of holes therein.

7 Claims, 2 Drawing Figures

STEAM HEATING APPARATUS

BACKGROUND AND SUMMARY OF THE INVENTION

This invention relates to devices for steam heating of foods or the like, such as those that have been precooked or may have become somewhat stale. Similar devices of this type have been known and are used for the steam heating of foods by treating the foods with steam in a closed chamber on perforated plates. In most of these devices, a heated platen is provided with a plurality of orifices therein through which water is sprayed and either simultaneously vaporized, or vaporized upon contact with the heated platen. Since precooked foods tend to lose much of their natural juices and moisture, steam heating provides a natural advantage in restoring moisture to the foods while they are reheated. This restoration of moisture assists in restoring the natural appetizing appearance, texture and taste of the food.

A major problem with prior steam cooking apparatus of this type, however, is that the orifices in the heated platen become clogged by solid particles or impurities which remain in the nozzle or spray orifices when the water is vaporized. The most common problem with impurities is that lime, which is present in almost every urban water system, remains in the orifices after vaporization of the water and the orifices therefore require periodic cleaning. The cleaning process usually involves the dismantling of the device to reach the clogged orifices and then scraping or drilling the orifices open.

The object of this invention is to provide a steam heating apparatus whereby the orifices can be maintained at a temperature well below that required to vaporize the water so that the orifices remain open and free of deposits.

This and other objects of the invention are achieved by the provision of an apparatus for steam heating food including a housing which forms a steam chamber and a heated platen mounted in the bottom of the housing. A thermally insulated water inlet means is provided into the steam chamber for introducing water into the steam chamber onto the top of the platen. A perforated, corrugated food support plate is mounted above the platen and water inlet means for supporting food items, and forming the top of the steam chamber, whereby steam generated by the platen will pass through the food support plate and heat the food items.

Other objects, features and advantages of the invention will be apparent from the following description taken in connection with the accompanying drawings.

DESCRIPTION OF THE PREFERRED EMBODIMENT

Figure 1:
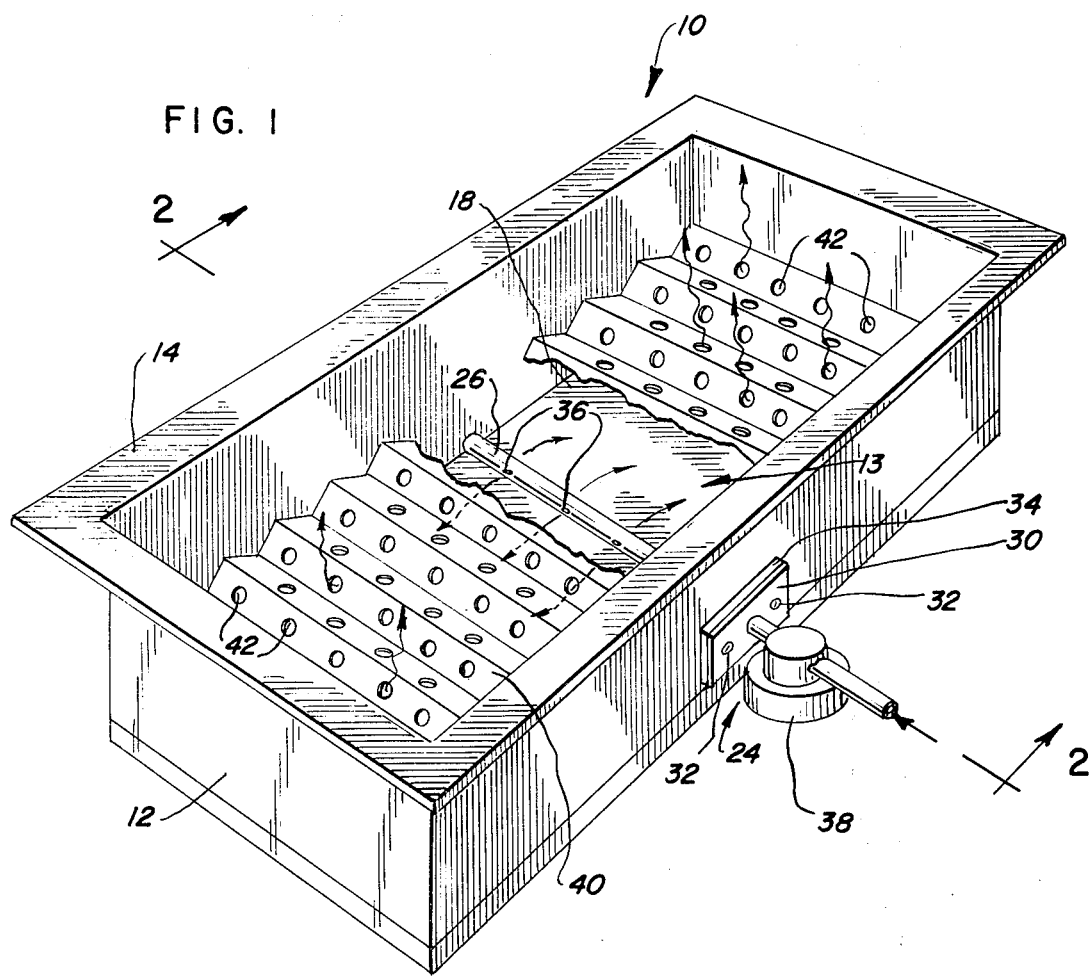
FIG. 1 is a fragmented perspective view of the food steamer of the present invention.

The food steamer of the present invention, generally designated 10 (FIG. 1), is designed to operate under atmospheric pressures. The steamer 10 includes an open top, generally rectangular housing 12 which forms a steam chamber, generally designated 13. The upper, open top of the housing includes a flange or lip portion 14 which enables the steamer 10 to be recessed in a countertop, or the like, if so desired.

Figure 2:
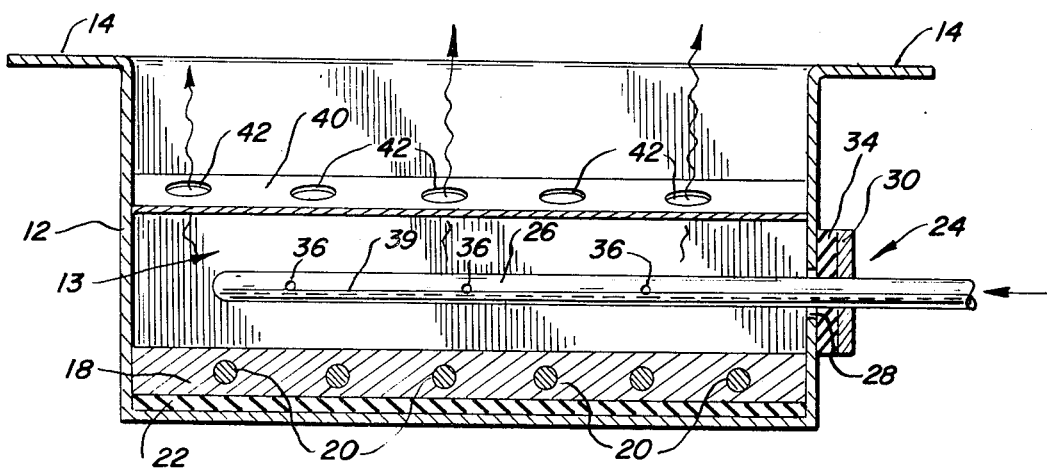
FIG. 2 is a vertical section taken generally along the line 2—2 of FIG. 1.

A steam generating platen 18 is mounted within the housing near the bottom thereof. The platen 18 includes a plurality of electrical heating elements 20, which are connected to an appropriate electrical source not shown, maintain the platen 18 at a relatively high temperature, approximately 350°, in order to generate steam. The platen 18 is thermally insulated from the housing 12 by a suitable insulation sheet 22, as seen in FIG. 2, which also may surround the sides of the platen.

Water inlet means, generally designated 24, is provided on the housing 12 to permit the introduction of water into the steam chamber 13. More particularly, the water inlet means 24 includes a generally elongated, closed ended tube 26 which extends into the steam chamber through an over-sized opening 28 in one of the side walls of the housing 12. The elongated tube 26 is formed with a mounting flange 30, which is fastened to the housing wall by a pair of screws 32. The flange is thermally insulated from the housing wall by a suitable washer-like insulator 34.

The elongated tube is connected to a source of cold water, under suitable pressure, and includes a plurality of side orifices 36 which spray the water outwardly onto the heated platen 18, as seen by the arrows in FIG. 1. The amount of water which is injected into the tube can be remotely controlled by a conventional solenoid valve 38 appropriately placed in the water supply line. The enlarged opening 28 and the insulator 34 prevent heat from being transferred from the housing to the tube 26 and thus keeps the elongated tube 26 at a temperature lower than that required to vaporize water. In addition, the orifices 36 are positioned midway, vertically, along the length of the tube 26 to retain some water within the tube at all times, as indicated by the water line 39 in FIG. 2. This water within the tube 26 helps to maintain the tube 26 at a temperature lower than that required to vaporize water. Since the tube is kept at a relatively low temperature, no water is vaporized within the tube 26 or at the orifices 36 and therefore no solid particles will accumulate to block the orifices 36 during use.

A food support plate 40 is mounted within the housing 12 above the platen 18 and the elongated tube 26. The food support plate 40 comprises a generally corrugated metallic sheet and includes a plurality of apertures 32 on the canted surfaces of the plate to permit steam to escape from the steam chamber and penetrate the food items. The corrugated construction of the food support plate 40 and the holes 32 in the canted surfaces thereof act to prevent the food items from blocking the orifices which often causes food items to become very moist and even soggy in some areas.

An appropriate cover (not shown), if desired, can be mounted, as by hinges, over the open top of the housing.

Any solid particles or impurities which are present in the water will collect on the platen 18 during vaporization. However, such accumulation does not interfere with the operation of the device as would the clogging of the orifices 36. To clean these impurities from the platen, the food support plate simply is removed and the platen is easily accessible. Since no vaporization has taken place within the elongated tube 26 or the orifices 36 these elements do not have to be removed or cleaned.

The foregoing detailed description has been given for clearness of understanding only and no unnecessary limitations should be understood therefrom as some modifications will be obvious to those skilled in the art.

We claim:

1. A steam heating apparatus for heating foods or the like, comprising:
   a housing forming a steam chamber;
   a heated, steam generating platen mounted in the steam chamber of the housing;
   water inlet means mounted on the housing above the platen for introducing water from a source thereof into the steam chamber, said inlet means being thermally insulated from said housing; and
   an apertured food support plate mounted above the platen and the water inlet means for supporting a food item thereon and forming the top of the steam chamber, whereby steam generated by the platen will pass through the food support plate and steam heat the food item.

2. The apparatus of claim 1 wherein the water inlet means includes a tube which enters the steam chamber through an over-sized aperture in the housing so as to be out of heat contact with the housing, said tube having at least one orifice therein to permit water to flow therethrough onto the platen.

3. The device of claim 2 wherein the tube extends generally parallel to the platen and includes a plurality of orifices to distribute the water generally evenly across the surface of the platen.

4. The device of claim 3 wherein the tube is generally horizontal within the housing and the orifices are positioned along the tube between the uppermost and lowermost points of the tube to maintain a level of the water injected thereinto within the tube for cooling purposes.

5. The device of claim 3 wherein the platen is generally flat and forms the bottom of the steam chamber.

6. The device of claim 1 wherein the water inlet means is secured to the housing wall and is insulated therefrom by a suitable thermal insulator.

7. The device of claim 1 wherein the food support plate is corrugated with apertures in the canted surfaces of the corrugated configuration so as to be spaced from the food item.

* * * * *